(12) United States Patent
Voss et al.

(10) Patent No.: US 8,922,661 B2
(45) Date of Patent: Dec. 30, 2014

(54) STABILIZING A SUBJECT OF INTEREST IN CAPTURED VIDEO

(75) Inventors: Shane Voss, Fort Collins, CO (US);
Robb Cazier, Fort Collins, CO (US);
Jason Yost, Windsor, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 289 days.

(21) Appl. No.: 13/387,059

(22) PCT Filed: Nov. 30, 2009

(86) PCT No.: PCT/US2009/066139
§ 371 (c)(1),
(2), (4) Date: Jan. 25, 2012

(87) PCT Pub. No.: WO2011/065960
PCT Pub. Date: Jun. 3, 2011

(65) Prior Publication Data
US 2012/0127329 A1  May 24, 2012

(51) Int. Cl.
*H04N 5/228* (2006.01)
*G06K 9/00* (2006.01)
*H04N 5/232* (2006.01)

(52) U.S. Cl.
CPC ....... *H04N 5/23267* (2013.01); *H04N 5/23219* (2013.01); *H04N 5/23254* (2013.01)
USPC ...................... 348/208.4; 382/103

(58) Field of Classification Search
None
See application file for complete search history.

(56) References Cited

U.S. PATENT DOCUMENTS

| 6,535,244 | B1 * | 3/2003 | Lee et al. .................. 348/208.1 |
| 7,643,066 | B2 * | 1/2010 | Henninger et al. ...... 348/211.99 |
| 2004/0100560 | A1 | 5/2004 | Stavely et al. |
| 2006/0203098 | A1 | 9/2006 | Henninger, III et al. |
| 2009/0128642 | A1 * | 5/2009 | Koh et al. ................. 348/208.11 |
| 2010/0045799 | A1 * | 2/2010 | Lei et al. ...................... 348/169 |

FOREIGN PATENT DOCUMENTS

| JP | 2004-191906 | 7/2004 |
| JP | 2006-289849 | 10/2006 |
| JP | 2010-022819 | 2/2010 |
| WO | WO-2004/056089 A2 | 7/2004 |

OTHER PUBLICATIONS

International Preliminary Report on Patentability, International Application No. PCT/US2009/066139, Jun. 5, 2012, pp. 1-6.
International Search Report and Written Opinion, International Application No. PCT/US2009/066139, Jul. 27, 2010, pp. 1-9.
Extended European Search Report, Application No. 09851762.6, Date: May 16, 2013, pp. 1-8.

* cited by examiner

*Primary Examiner* — Luong T Nguyen
(74) *Attorney, Agent, or Firm* — Hewlett-Packard Patent Department

(57) ABSTRACT

A method of stabilizing a subject of interest in captured video includes identifying the subject of interest within a crop window and establishing a first subject bounding window that includes the subject of interest. The method continues with refraining from substantially changing the first subject bounding window while the subject of interest moves within the first subject bounding window and establishing a second subject bounding window within the crop window that includes the subject of interest when the subject of interest exits the first subject bounding window.

20 Claims, 4 Drawing Sheets

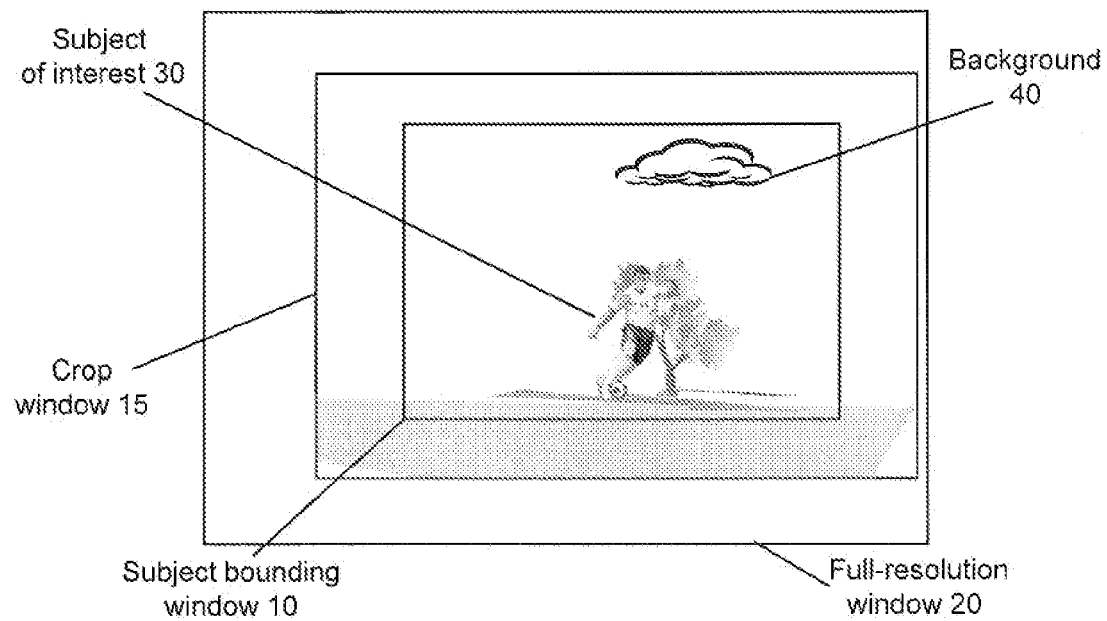
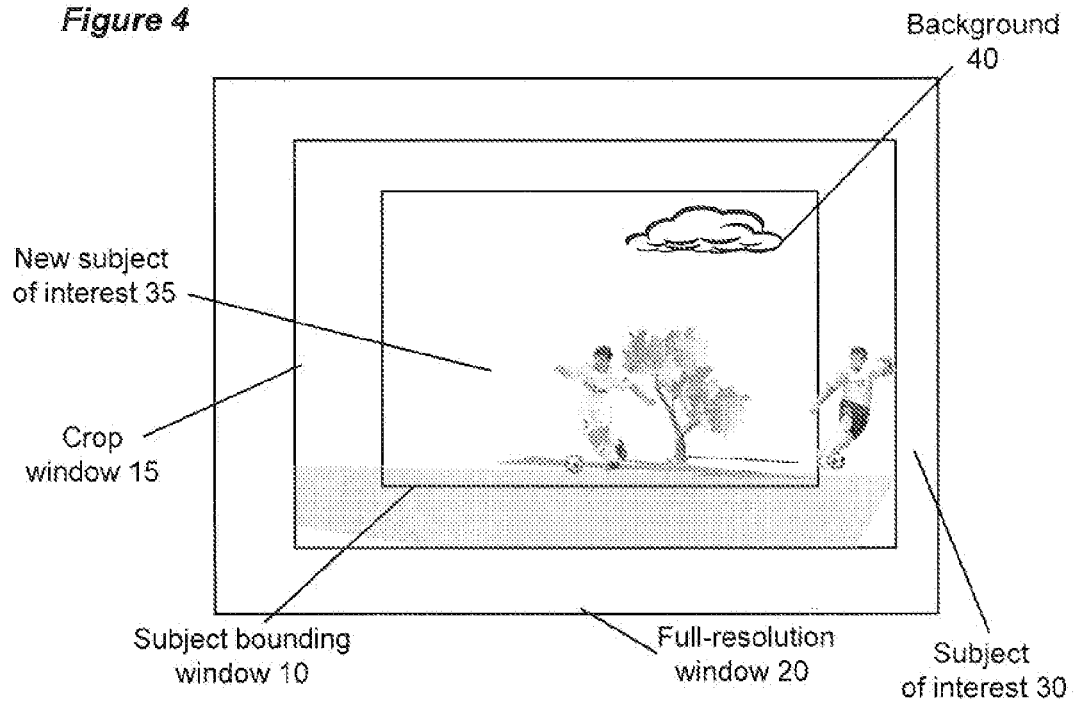

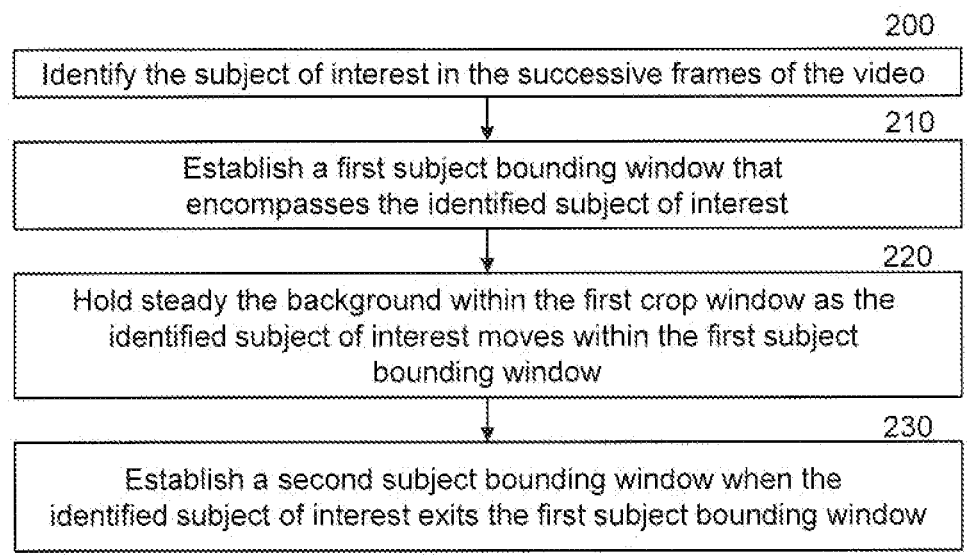
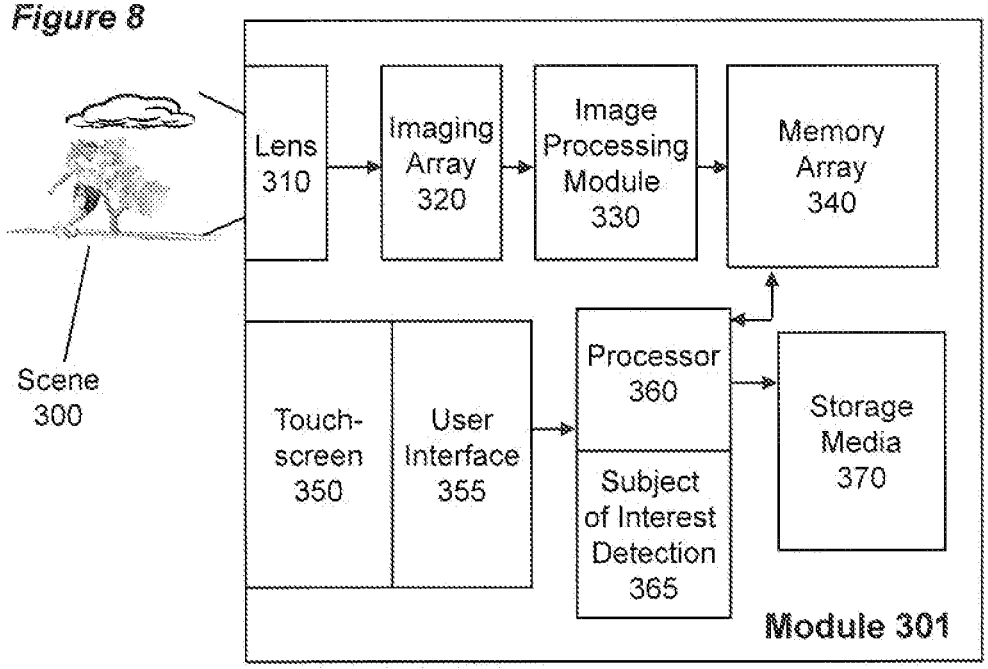

STABILIZING A SUBJECT OF INTEREST IN CAPTURED VIDEO

BACKGROUND

When using a digital video camera that includes an image stabilization feature, the camera may place the subject of interest at the center of the video frame. As the subject moves within the frame, the camera may reorient the video frame to maintain the subject of interest at or near the center of the frame. Face detection may also be used to identify the subject of interest.

However, when the subject of interest moves within the camera's field of view, an image stabilization algorithm operating within the camera may constantly attempt to re-center the subject. When this happens, the recorded video takes on a very unnatural quality. In many instances, the recorded video appears jerky as the subject is continually (perhaps numerous times within just a few seconds) forced by the camera to the center of the video frame as the subject moves within the frame.

BRIEF DESCRIPTION OF THE DRAWINGS

FIG. 3 shows the movement of the background of the captured image to place the subject of interest nearer to the center of the crop window according to an embodiment of the invention.

FIG. 4 shows a subject of interest that has moved outside of a subject bounding window according to an embodiment of the invention.

FIG. 7 is a method of stabilizing a subject of interest in captured video according to another embodiment of the invention.

FIG. 8 is a block diagram for a module used to stabilize a subject of interest in captured video according to embodiments of the invention.

DESCRIPTION OF THE EMBODIMENTS

Stabilizing a subject of interest in captured video allows a video camera user to record natural-looking video of the subject of interest as the subject moves within a crop window. In one embodiment of the invention, when the subject moves within a subject bounding window located within a crop window, the subject bounding window remains unchanged and the camera records the user moving within the subject bounding window against a stable background. When the subject of interest moves outside of the subject bounding window, the window is moved and the current location of the subject of interest is placed near the center of the new subject bounding window. The new window is then held steady as the subject of interest moves within the new window.

Embodiments of the invention differ from conventional solutions at least in that the subject bounding window is moved only when the subject of interest exits the bounding window. In conventional solutions, as the subject moves within the field of view, the video camera constantly re-centers the subject of interest. As a result, the recorded video (especially the background) appears shaky and unnatural as the subject is forced towards the center of the frame, often several times within a few seconds.

Figure 1:
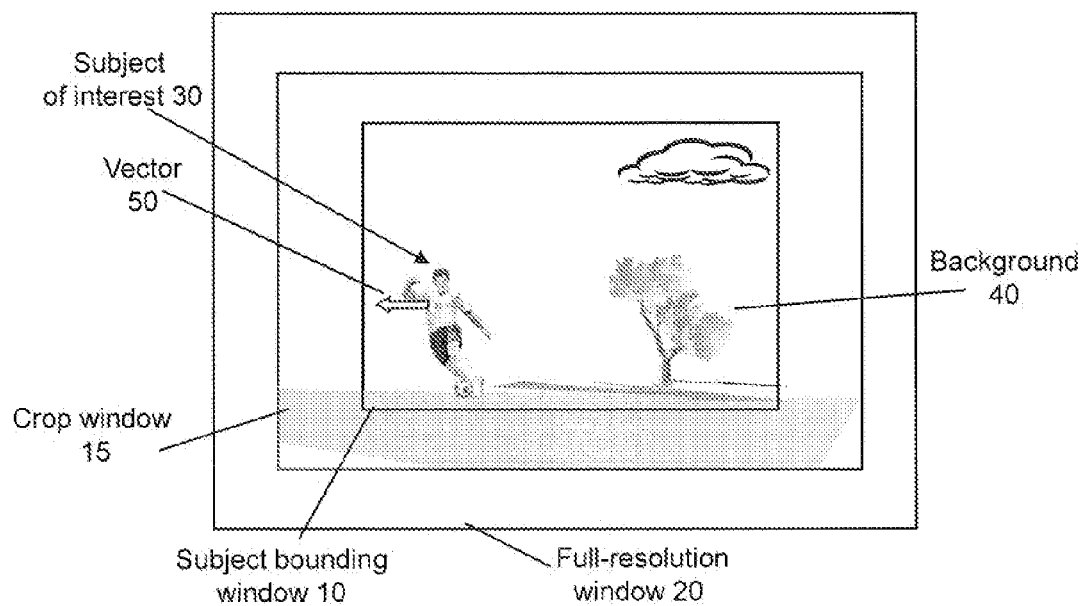
FIG. 1 represents a subject of interest moving in a subject bounding window within a crop window according to an embodiment of the invention.

FIG. 1 represents a subject of interest moving in a subject bounding window within a crop window according to an embodiment of the invention. In FIG. 1 full-resolution window 20 surrounds crop window 15. Within crop window 15, subject of interest 30 moves inside of subject bounding window 10. In the embodiment of FIG. 1, full-resolution window 20 represents the largest area that can be captured by the imaging array of the camera recording the scene. Vector 50, as shown by the arrow in FIG. 1, indicates the two-dimensional motion of subject of interest 30 from right to left. In this embodiment of the invention, so long as subject of interest 30 stays within subject bounding window 10, the bounding window does not move within crop window 15. Consequently, background 40 is held steady.

It should be noted that in at least some embodiments of the invention, subject bounding window 10 is not visible to the user of the camera capturing the scene depicted in FIG. 1. Subject bounding window 10 represents a bounding area used by embodiments of the invention to enable an algorithm to function without requiring the user to exercise direct control over the window. In contrast to window 10, crop window 15 is displayed to the user in at least some embodiments of the invention. Further, the inventors contemplate that in at least some embodiments of the invention, subject bounding window 10 and crop window 15 move together as will be seen in reference to FIG. 2.

The inventors contemplate that through the use of a saliency algorithm such as face detection, edge detection, facial expression detection, skin tone detection, and so forth, the location of the subject within crop window 15 has already been found. An exemplary detection algorithm is provided in U.S. Pat. No. 7,099,510 entitled "Method and System for Object Detection in Digital Images" or perhaps as provided in numerous other patent applications and issued US and foreign patents. When the location of the subject's face or other salient feature has been determined, subject bounding window 10 is positioned around the subject of interest.

Figure 2:
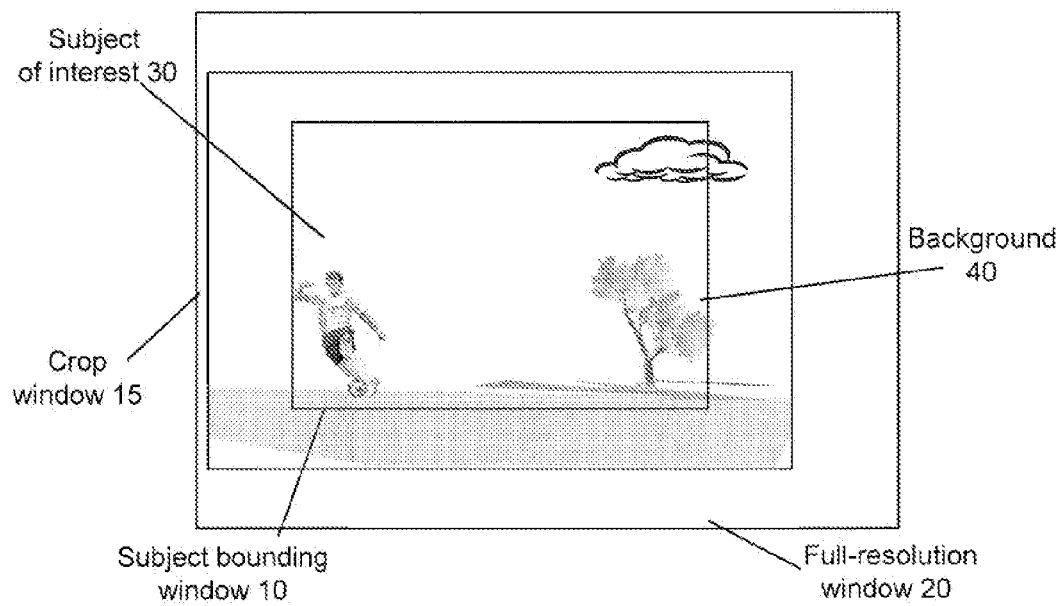
FIG. 2 shows a subject bounding window moving along with the crop window of FIG. 1 in response to the subject of interest moving outside of subject bounding window of FIG. 1 according to an embodiment of the invention.

FIG. 2 shows a subject bounding window moving along with the crop window of FIG. 1 in response to the subject of interest moving outside of subject bounding window of FIG. 1 according to an embodiment of the invention. In FIG. 2, subject of interest 30 has moved far enough to the left so as to cause subject bounding window 10 and crop window 15 to be repositioned to the left. Accordingly, a different portion of background 40 is shown within subject bounding window 10. In the embodiment of FIG. 2, subject bounding window 10 is moved if (and only if) the subject of interest has moved outside of the original subject bounding window, shown in FIG. 1.

It should be pointed out that the relationship between full-resolution window 20, crop window 15, and subject bounding window 10 may be much different than that shown in FIGS. 1 and 2. In FIGS. 1 and 2, full-resolution window 20 is shown as encompassing perhaps twice the area of crop window 15. Additionally, crop window 15 is shown as encompassing perhaps twice the area of subject bounding window 10. However, in some embodiments of the invention, full-resolution window 20 may encompass many times the area as crop window 15, such as 15 or 20 times the area of the crop window, or maybe even larger. In a similar manner, crop window 15 may be many, many times larger than subject bounding window 10. A full-resolution window that is much larger than the crop window may allow the captured images to remain steady while the crop window moves relatively freely to accommodate the motion of the subject of interest and the subject bounding window.

In addition to the variability in the relative sizes of subject bounding window 10, crop window 15, and full-resolution window 20, these windows may also be of varying shapes. For example, subject bounding window 10 may be shaped as an oval, while crop window 15 is shaped as a square. These shapes may be used within a rectangular-shaped full resolution window 20.

FIG. 3 shows the movement of the background of the captured image to place the subject of interest nearer to the center of the crop window according to an embodiment of the invention. In FIG. 3, subject of interest 30 has moved toward the tree shown at the right hand side of subject bounding window 10. In this embodiment of the invention, it is desirable to place the subject of interest 30 at the center of subject bounding window 10. Accordingly, subject bounding window 10 and crop window 15 have been repositioned to the right.

FIG. 4 shows subject of interest 30 having moved outside of subject bounding window 10 according to an embodiment of the invention. As the subject of interest is no longer within subject bounding window 10, a new subject of interest (35) has been identified. In this embodiment of the invention, when subject of interest 30 moves to a position that cannot be compensated for, subject bounding window 10 is slowly and gracefully re-centered on new subject of interest 35.

Figure 5:
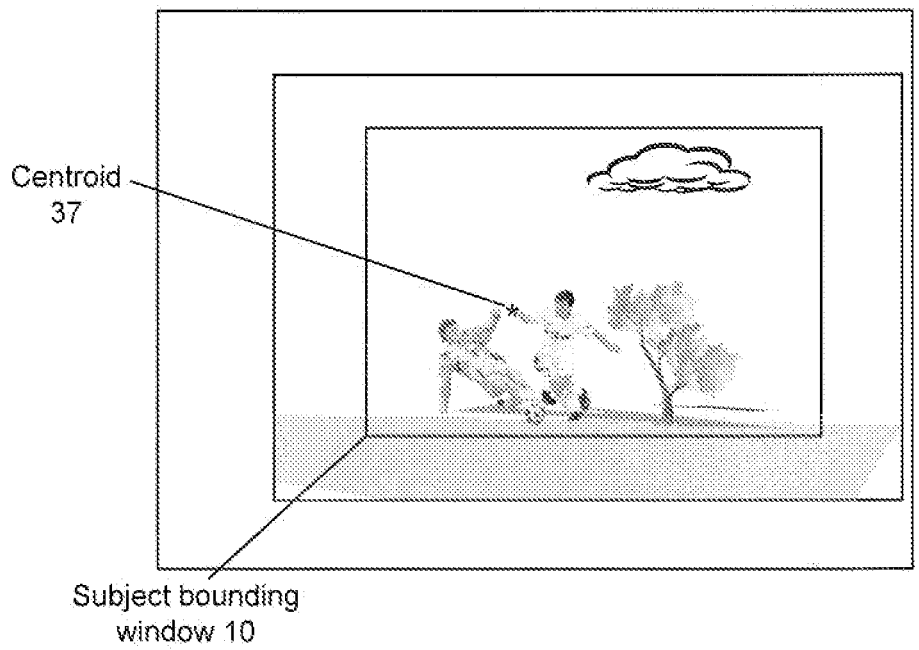
FIG. 5 shows a composite of two subjects within a subject bounding window according to an embodiment of the invention.

FIG. 5 shows a composite of two subjects within subject bounding window 10 according to an embodiment of the invention. In FIG. 5, centroid 37 represents a spatially averaged location between the two subjects of interest. In the embodiment of FIG. 5, the location of centroid 37 is tracked and the subject bounding window relocated based on the location and the two-dimensional motion vector of the centroid.

In FIGS. 1-5, subject bounding window 10 has been shown as being fixed at or near the center of crop window 15. However, in other embodiments of the invention, subject bounding window 10 may be allowed to move more freely within crop window 15 and may not be required to occupy a center portion of the crop window.

Figure 6:
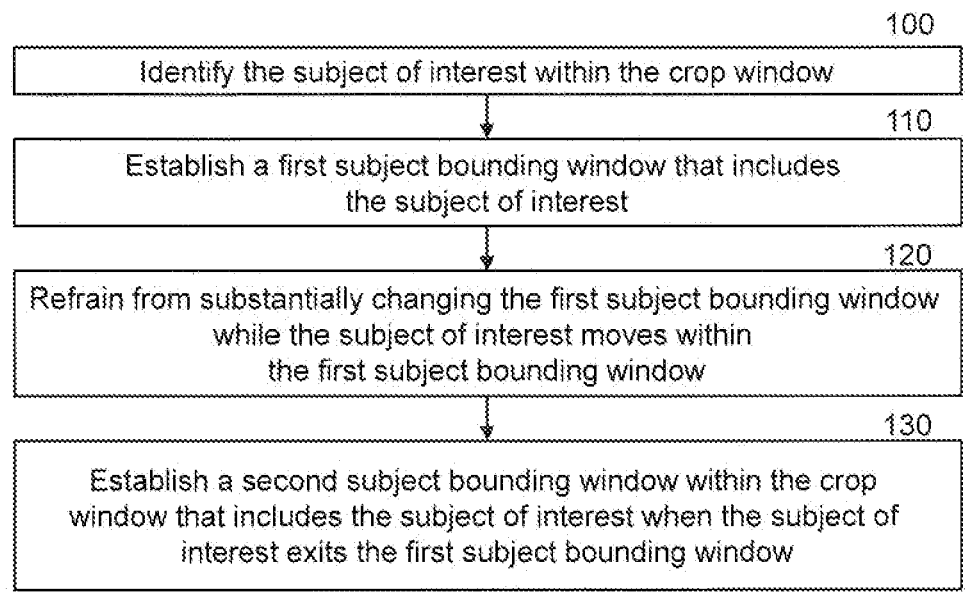
FIG. 6 is a method of stabilizing a subject of interest in captured video according to an embodiment of the invention.

FIG. 6 is a method of stabilizing a subject of interest in captured video according to an embodiment of the invention. The method of FIG. 6 begins at step 100 in which a subject of interest is identified within the crop window. In one embodiment of the invention, the identification of the subject of interest includes using a saliency algorithm such as face detection, edge detection, facial expression detection, skin tone detection, and so forth to detect a single human face (such as the face of subject of interest 30) within a full-resolution window. In another embodiment of the invention, the subject of interest is a composite of two or more subjects (represented by centroid 37) that indicates the location of two or more human faces whose location has been averaged in the subject bounding window.

The method continues at step 110, which includes establishing a first subject bounding window that includes the subject of interest. In this step, the subject bounding window is formed inside the crop window. At step 120, so long as the subject of interest moves within the subject bounding window, the camera refrains from substantially changing the location of the subject bounding window. In some embodiments of the invention, step 120 includes computing a two-dimensional motion vector that characterizes the movement of the subject of interest. The two-dimensional motion vector may be used to determine the direction that subject bounding window 10 should move in order to best accommodate subject of interest 30 when the subject of interest exits window 10.

At step 130, when the subject of interest exits the subject bounding window, the camera establishes a second subject bounding window that includes the new location of the subject of interest. The camera maintains the subject of interest within the second subject bounding window so long as the subject does not move outside of the second subject bounding window. Step 130 may also include centering the subject of interest within the within the second subject bounding window. Other embodiments of the invention may also include the step of identifying a second subject of interest when a first subject of interest approaches and edge of a full resolution window that encompasses the crop window.

FIG. 7 is a method of stabilizing a subject of interest in captured video according to another embodiment of the invention. The method of FIG. 7 begins at step 200, which includes identifying the subject of interest in the successive frames of the video. In step 200, the identification of the subject of interest in the successive frames of the video may occur without user input, perhaps as a result of the video camera identifying one or more human faces or other salient features of a subject of interest within the successive frames of the video using a suitable face or other type of detection algorithm. The identification in step 200 may also occur by way of receiving a user input that designates the subject of interest in the successive frames of the video. In an example of this embodiment, a touchscreen that displays the video frame to the user may receive an input from the user that designates the subject of interest. Thus, for example, in the event that the user is filming his or her new pet, the user may select the pet on a display of the video camera. After the user has designated the pet, the camera may establish a subject bounding window and holds the subject bounding window steady while the pet moves within the window.

The method continues at step 210, in which a first subject bounding window that encompasses the identified subject of interest is established. At step 220, the camera holds steady the background within the first crop window as the identified subject of interest moves within the first subject bounding window. At step 230, a second subject bounding window is established when the identified subject of interest exits the first subject bounding window.

It should be noted that the method of FIG. 7 can also be performed on a video stream stored on a storage media located outside of a video camera. In this embodiment, a processor stores successive frames of the video in a memory. Using a saliency algorithm such as face detection, edge detection, facial expression detection, skin tone detection, and so forth, and/or perhaps with the assistance of a user, the subject of interest is identified within the successive frames of the video (as in step 200 of FIG. 7). At step 210, the processor establishes a first subject bounding that encompasses the identified subject of interest. As the subject of interest (either as aided by a user, or perhaps as identified automatically by way of a detection algorithm) moves within the first subject bounding window, the background is held steady within the first crop window, as in step 220. When the subject of interest moves outside of the first subject bounding window, a second subject bounding window is established, as in step 230 of FIG. 7.

FIG. 8 is a block diagram for a module used to stabilize a subject of interest in captured video according to embodiments of the invention. Although module 301 of FIG. 8 can be used to perform the method of FIGS. 6 and 7, nothing prevents the use of alternately-configured hardware, software, or firmware modules to perform the methods.

In FIG. 8, lens 310 focuses incoming light from scene 300 onto imaging array 320. Imaging array 320 includes a CCD or CMOS imaging array that converts the incident optical signals that represent scene 300 into discrete electrical charges. The electrical charges are processed by image processing module 330, which applies correction factors to compensate for vignetting, color dependent shading across imaging array 320, channel balancing, and conversion from the raw outputs of the imaging array to a standard color space, such as RGB, sRGB, and so forth. The output of each frame of image processing module 330 is then mapped to memory array 340.

In one embodiment of the invention, processor 360 operates in conjunction with subject of interest detection module 365 to automatically (in which "automatically" implies "without user input") detect the subject present in scene 300. Subject of interest detection module 365 may include a saliency algorithm such as face detection, edge detection, facial expression detection, skin tone detection and so forth to determine the presence of a subject of interest. In this embodiment of the invention, processor 360 identifies the subject of interest within scene 300 and establishes a subject bounding window that encompasses the subject of interest along with at least a portion of the background of the scene. When the subject of interest exits the subject bounding window, processor 360 determines the new location of the subject of interest and establishes a subject bounding window within memory array 340 around the new location of the subject of interest.

In another embodiment of the invention, processor 360, operating in conjunction with subject of interest detection module 365, averages the location of more than one face detected in scene 300 and identifies a composite as representing the two or more subjects. In this embodiment, when the composite that represents the two or more subjects exits the subject bounding window, processor 360 and subject of interest detection module 365 establish a new subject bounding window within memory array 340. Within the second subject bounding window, the subject of interest may move about while processor 360 holds the second subject bounding window steady. The successive frames of the subject of interest and the background within the subject bounding windows are then stored within storage media 370.

In another embodiment of the invention, the user may interact with touchscreen 350 and/or user interface 355 to select the subject of interest. In this embodiment of the invention, the user may surround a shape of the subject of interest using a stylus or his/her finger to directly interact with the touchscreen. Once the subject of interest has been selected, a subject bounding window may be established around the subject of interest. When the subject of interest exits the subject bounding window, processor 360 establishes a second subject bounding window around the new location of the subject of interest.

In other embodiments of the invention, memory array 340 stores a previously captured succession of video frames to which the methods of the claimed invention can be applied. As the successive frames of the video stream are written to memory array 340, processor 360, operating in conjunction with subject of interest detection, module 365, may make use of an algorithm to detect the presence of one or more subjects of interest within the video stream. Processor 360 may establish and hold steady the background of a subject bounding window within the video stream in a manner that allows the subject of interest to move within the subject bounding window. When the subject of interest moves outside of the subject bounding window, processor 360 and subject of interest detection module 365 operate to reorient the subject bounding window to include a new portion of memory array 340 in which the subject of interest is re-centered.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method of stabilizing a subject of interest in captured video, comprising:
   identifying the subject of interest within a crop window;
   establishing a first subject bounding window that includes the subject of interest;
   refraining from substantially changing the first subject bounding window while the subject of interest moves within the first subject bounding window; and
   establishing a second subject bounding window within the crop window that includes the subject of interest when the subject of interest exits the first subject bounding window.

2. The method of claim 1, wherein the identifying further comprises employing an algorithm to identify the subject of interest.

3. The method of claim 2, wherein the subject of interest is a composite that represents two or more subjects.

4. The method of claim 1, additionally comprising computing a two-dimensional motion vector that characterizes movement of the subject of interest.

5. The method of claim 1, wherein the establishing of a second subject bounding window includes centering the subject of interest within the second subject bounding window.

6. The method of claim 1, additionally comprising identifying a second subject of interest when the subject of interest approaches an edge of a full resolution window that encompasses the crop window.

7. A method of stabilizing a subject of interest within successive frames of a video, comprising:
   identifying the subject of interest in the successive frames of the video;
   establishing a first subject bounding window that encompasses the identified subject of interest, the first subject bounding window being within a first crop window;
   holding steady a background within the first crop window as the identified subject of interest moves within the first subject bounding window; and
   establishing a second subject bounding window when the identified subject of interest exits the first subject bounding window.

8. The method of claim 7, wherein the identifying of the subject of interest within a crop window further comprises employing an algorithm to determine that a face is present in the successive frames of the video.

9. The method of claim 7, wherein the identifying of the subject of interest within a crop window includes a user selecting the subject of interest by way of a user interface.

10. The method of claim 7, wherein the establishing of the second subject bounding window further comprises centering the identified subject of interest within a second crop window, the second crop window encompassing the second subject bounding window.

11. The method of claim 7, wherein the establishing of the first subject bounding window further comprises establishing a two-dimensional motion vector for the subject of interest using the successive frames of the video.

12. The method of claim 7, wherein the holding steady of the background further comprises detecting an object in the background and maintaining the relative position of the object in the successive frames of the video.

13. A module for stabilizing a subject of interest in captured video, comprising:
a memory array for storing captured images;
a processor for determining a subject of interest in the captured images, wherein
the processor establishes a first crop window within the memory array that encompasses a subject bounding window, and wherein
the processor establishes a fixed relationship between an area encompassed by the subject bounding window and the first crop window.

14. The module of claim 13, wherein the processor additionally performs an algorithm to determine a presence of the subject of interest in a video frame.

15. The module of claim 13, wherein the processor relocates the subject of interest window and the first crop window when the subject of interest moves outside of the subject bounding window.

16. The method of claim 1, further comprising displaying the crop window to a user on a display of said video.

17. The method of claim 1, further comprising establishing a second crop window when establishing the second subject bounding window.

18. The method of claim 1, wherein, if the subject of interest moves to a position around which a new subject bounding window cannot be placed, a new subject bounding window is established around a new subject of interest.

19. The method of claim 1, wherein identifying the subject of interest is performed automatically without user input.

20. The method of claim 1, wherein identifying the subject of interest is performed by receiving user input that identifies the subject of interest.

* * * * *